3,824,093
CONTROL OF WEEDS WITH CYANO-CYCLOPROPYL DERIVATIVES OF DIAMINO-s-TRIAZINES

Manfred Kuhne, Pfeffingen, Basel-Land, and Christian Vogel, Binningen, Basel-Land, Switzerland, assignors to Ciba-Geigy Corporation, Ardsley, N.Y.
No Drawing. Original application May 26, 1971, Ser. No. 147,170, now Patent No. 3,766,182. Divided and this application June 25, 1973, Ser. No. 373,041
Claims priority, application Switzerland, May 29, 1970, 8,079/70; Dec. 1, 1970, 17,772/70
Int. Cl. A01n 9/22
U.S. Cl. 71—93                 15 Claims

ABSTRACT OF THE DISCLOSURE

Substituted diamino-s-triazine derivatives defined by the following structural formula:

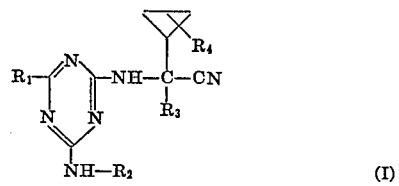

wherein $R_1$ is one selected from the group consisting of chlorine, the methoxy, methylthio or ethylthio radical; $R_2$ is selected from the group consisting of hydrogen, $C_1$–$C_4$ alkyl and $C_3$–$C_5$ cyclo-alkyl; $R_3$ is selected from the group consisting of $C_1$–$C_3$ alkyl and cyclopropyl; $R_4$ is selected from the group consisting of hydrogen and the methyl radical.

Diamino-s-triazine derivatives represented by this structure have been found to possess herbicidal activity and are especially useful as pre- and post-emergent herbicides for the selective control of weeds and wild grasses in culture crops such as wheat, sorghum, soya beans, cotton and rice.

---

This is a division of application Ser. No. 147,170, filed on May 26, 1971, now Pat. No. 3,766,182.

The present invention relates to new s-triazine derivatives, to processes for their production, to the use of the new triazines for the control of weeds and wild grasses, also to agents for the control of such weeds, and to processes for the control of weeds and wild grasses using the new s-triazine derivatives or agents containing them.

A considerable number of triazines have become known as herbicidal active substances which, because of their pronounced herbicidal activity, can be used for the control of weeds in the most diverse cultivated plantations. Thus, for example, from the series of 2-chloro-, 2-methoxy- and 2-methylthio-4,6-bis(subst. alkylamino)-s-triazines several representative agents have assumed great importance for the selective control of weeds in cultivations of grain, maize, and animal feeding stuffs. More recently, triazine derivatives having cyanoalkylamino groups and cyclopropylamino groups have also become known (e.g. U.S.A. Pat. 3,451,802, French Pat. 1,536,479, and Belgian Pats. 730,134 and 730,135), these triazine derivatives displaying, with regard to effect and selectivity, certain advantages in the case of various cultivated-plant crops, but not being entirely satisfactory with respect to selectivity in the case of certain cultivated plants, or exhibiting unpleasant gaps in their sphere of action against weeds which are combined with the said cultivated plants. This is particularly so in the case of types of grain, rice, soya beans, sorghum, cotton, etc., and with regard to the weeds frequently present in these cultivated plantations.

The aim of the present invention was therefore to develop herbicidal active substances which display, with better protection of various cultivated plants, a good and, as far as possible, complete herbicidal action against the weed flora present amongst the said cultivated plants.

It has now been found that substituted diamino-s-triazine derivatives of formula I

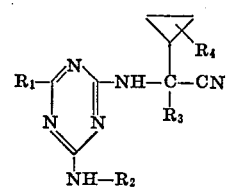

satisfy these requirements. The symbols in this formula have the following meanings:

$R_1$ represents chlorine, the methoxy, methylthio, or ethylthio radical, $R_2$ represents hydrogen, an alkyl radical having 1 to 4 C-atoms, or a cycloalkyl radical having 3 to 5 C-atoms, $R_3$ represents an alkyl radical having 1 to 3 C-atoms, or the cyclopropyl radical, and $R_4$ represents hydrogen or the methyl radical.

In this formula, an alkyl radical $R_2$ represents the methyl, ethyl, n-propyl, or isopropyl radical, or one of the 4 possible isomeric butyl radicals; $R_2$ can also represent the cyclopentyl, cyclobutyl or, preferably, the cyclopropyl radical.

The new diamino-s-triazine derivatives of formula I are produced according to the invention by reacting an aminonitrile of formula II:

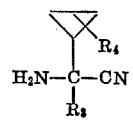

wherein $R_3$ and $R_4$ have the meanings given under formula I, preferably, however, a salt of such an aminonitrile, with cyanuric chloride in a solvent or diluent, and in the presence of an acid-binding agent, at temperatures below 30° C.; thereupon reacting the formed intermediate of formula III:

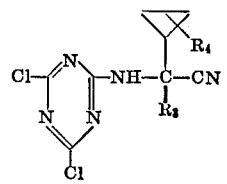

with an amine of the formula $R_2$—$NH_2$, in the presence of an acid-binding agent and a solvent or diluent, at a temperature of between 10 and 50° C.; and, optionally, replacing the last chlorine atom remaining, in a manner known per se, by a methoxy group, or by the methylthio or ethylthio group.

According to one variant of this process, it is also possible to react the aminonitrile of formula II, or a salt thereof, with a 2,4-dichloro-6-amino-s-triazine of formula IV:

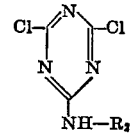

in the presence of a base; and, optionally, to replace the remaining chlorine atom of the formed 2-chloro-4-amino-6-[1'-cyclopropyl-1'-cyano-alkylamino]-s-triazine by the methoxy, methylthio, or ethylthio group in a manner known per se.

Triazine derivatives of formula I wherein $R_1$ represents the methylthio or ethylthio radical can also be produced by starting with corresponding 2,4-dichloro-6-alkylthio-s-triazines; these are reacted with aminonitriles of formula II or with salts thereof, in the presence of an acid-binding agent, to obtain 2-chloro-4-alkylthio-6-[1'-cyclopropyl-1'-cyano-alkylamino]-s-triazines, and from these are then produced with ammonia or a primary alkyl- or cycloalkylamine of formula $R_2NH_2$, in the presence of an acid-binding agent, alkylthio-s-triazine derivatives according to the invention (Example 5). Basically, it is possible to choose as desired the sequence of introduction of the substituents into the triazine ring.

The replacement of the chlorine atom in a 2-chloro-4-amino - 6-[1'-cyclopropyl-1'-cyano-alkylamino]-s-triazine by the methoxy group is performed, in a known manner, by reaction with an alkali metal methylate, especially sodium methylate, in methanol, refluxing being carried out until completion of the reaction; or by heating of a solution of the stated 2-chlorotriazine in a methanolic solution in the presence of the double molar amount of a condensation agent such as trimethylamine.

The replacement of the chlorine atom by the methylthio or ethylthio radical can be effected by adding to a suspension of the stated 2-chlorotriazine in a diluent, e.g. in acetone/water, aqueous trimethylamine solution, and stirring until a clear solution is obtained; the double molar amount of gaseous methylmercaptan or ethylmercaptan is then introduced, the whole stirred at room temperature, and the obtained oil processed. The replacement of the chlorine atom may also be effected by adding 2-chloro-4-amino-6-[1'-cyclopropyl-1'-cyano-alkylamino]-s-triazine to an alcoholic or alcoholic/aqueous solution of an alkali metal mercaptide, and refluxing the thus obtained mixture until it exhibits a neutral reaction.

The aminonitriles of formula II and their salts used as starting materials are new compounds not hitherto described in the literature. They are produced, for example, according to the method of Strecker by treating a known alkylcyclopropyl ketone of formula V (French Pat. 1,239,959; U.S. Pat. 3,122,587; Angew. Chemie 80, page 578; Bulletin Soc. chim. France 1962, p. 1634):

(V)

wherein $R_3$ and $R_4$ have the meanings given under formula I in ether with ammonium chloride and aqueous sodium cyanide solution. In the processing of the ether extracts the immediate precipitation of the hydrochloride of the obtained aminonitrile of formula II is effected preferably by the introduction of HCl gas. Further methods of preparation of aminonitriles of formula II from ketones of formula V will be discussed in more detail later.

Suitable solvents or diluents for the reaction of the aminonitrile of formula II or of a salt, especially the hydrochloride, with cyanuric chloride or with a 2,4-dichloro-6-amino-s-triazine of formula IV are water, aliphatic and aromatic hydrocarbons and halogenated hydrocarbons, ethers and ethereal compounds, nitriles, amides, ketones, etc., as well as mixtures of such solvents with each other and with water, preferably toluene/water mixtures.

The same applies for the reaction of the intermediate of formula III with an amine of the formula $R_2$—$NH_2$ and for the reaction of a 2,4-dichloro-6-alkylthio-s-triazine with a nitrile of formula II and an amine of the formula $R_2$—$NH_2$.

Applicable as acid-binding agents for these reactions are inorganic bases such as alkali metal hydroxides or carbonates and alkaline-earth metal hydroxides or carbonates, an excess of amine $R_2$—$NH_2$ to be reacted, also tertiary amines such as trialkylamines, pyridine and pyridine bases. Inorganic bases, particularly the alkali metal hydroxides such as NaOH, are, however, to be preferred. As acid-binding agent for the reaction with ammonia ($R_2$=H) is preferably used an excess of ammonia.

The reactions of the aminonitrile of formula II with cyanuric chloride are performed in the temperature range of —30° to +30° C. and last, depending on the chosen temperature, for several minutes to 10 hours. The reaction of the intermediate product of formula III with the amine of the formula $R_2$—$NH_2$ is carried out at temperatures of 10 to 50° C., and can last up to 3 days.

If the aminonitrile of formula II is reacted with a dichloroamino-s-triazine of formula IV, the reaction time amounts to 6 minutes to 10 hours at temperatures of 0° to 40° C.

The new substituted diamino-s-triazine derivatives of formula I possess excellent herbicidal properties and are suitable, in particular, for the control of gramineous and broad-leaved weeds in various cultivated plantations. Applied in high concentrations, the new compounds act as total herbicides; in low concentrations, on the other hand, they act as selective herbicides. Annual or perennial types of weeds which are deep-rooted and difficult to control are destroyed or damaged in growth with a good degree of success by the active substances of formula I. The application of the new active substances can be effected with the same high degree of success before emergence (pre-emergence) and after emergence (post emergence). Field weeds such as, e.g. millet varieties (Panicum sp.), mustard varieties (Sinapis sp.), goosefoot varieties (Chenepodiaceae), slender foxtail (Alopecurus sp.) and other pig weed varieties, e.g. Amaranthus sp., grasses, e.g. Lolium sp., Compositae, e.g. Taraxacum sp., wild chamomile varieties (Matricaria sp.), are thus destroyed or inhibited in growth without damage being done to useful plants such as grain, maize, cotton, sorghum, soya beans, etc. Furthermore, difficultly controllable varieties of weeds in rice plantations are controlled by these active substances, e.g. in wet rice plantations: Echinochloa sp., Elocharis sp., Panicum sp., Cyperaceen, Paspalum sp., etc.; in dry rice plantations likewise Echinochloa sp. Digitaria sp., Brachiaria sp., Sida sp. Cyperaceen, Acanthosperum sp., etc. Since in the usual application concentrations the active substances are not toxic for warm-blooded animals, fishes and animals feeding on fish, and only gradually destroy the plants, thus not impairing the oxygen balance and the biological equilibrium, they are very suitable for use in wet rice cultivations. Moreover, the active substances have a wide sphere of action with respect to diverse water weeds, e.g. emersed plants, water plants with and without floating leaves, submerged plants, algae, etc.

The wide sphere of action of the new substituted diamino-s-triazines of formula I renders possible their use also for the important control of weeds and wild grasses on the areas surrounding the rice cultivations, such as ditches, canal beds, dams, etc. Not only the mentioned wild grasses occurring in rice cultivations are destroyed but also other gramineous and broad-leaved weeds. The active substances can be used, in the preparation of rice beds, after germination of the plants, also for the destruction of an already germinated crop of weeds. Both rice cultivated in water and that cultivated dry suffer no damage as a result of the application of the new active substances in the usual amounts, and in high concentrations the damage is to a great extent reversible. The applied amounts vary and are dependent on the time of application; they are between 0.1–10 kg. of active substance per hectare; in the case of application before emergence of the plants the amount is up to 1 kg. of active substance per hectare, and after emergence of the plants it is 3 to 10 kg. of active substance per hectare, whereby for such a total destruction of the whole weed crop, e.g.

on the fallow land adjacent to the cultivated land, it is necessary to use more than 10 kg. of active substance per hectare. The crop rotation so important for the cultivation of rice can, on application of the new active substances, be effected without impairment.

The process according to the invention for the production of the new active substances of formula I is illustrated by the following examples. The term "parts" denotes parts by weight, and temperatures are given in degrees Centigrade.

Example 1

The procedure for producing the starting material is as follows:

To a mixture of 123 g. of $NH_4Cl$ (2.3 mol), 181 g. of methylcyclopropyl ketone (2.15 mol) and 1 litre of ether are added dropwise at $+5$ to $+10°$, with cooling, 122.5 g. (2.5 mol) of NaCN dissolved in 600 ml. of water. The reaction vessel is sealed, and the contents are stirred for 3 days at room temperature. The aqueous phase is thereupon separated, extracted three times with 500 ml. of ether, and the combined ether phases are dried with $Na_2SO_4$. The amine is not isolated but precipitated as hydrochloride by the introduction of HCl-gas. Thus obtained is the hydrochloride of 2-cyclopropyl-2-aminopropionitrile, M.P. 88–90°. The free base has the boiling point: $B.P._{15}=87°$.

An amount of 55.3 g. of cyanuric chloride is dissolved in 500 ml. of toluene; to the solution are then added, with stirring, 44 g. of 2-cyclopropyl-2-aminopropionitrile hydrochloride. To the formed suspension are added dropwise at $-10°$, with stirring, 24 g. of NaOH dissolved in 60 ml. of water. The mixture is further stirred at $-10°$ and shows a neutral reaction after ca. 3 hours. The mixture is then filtered, the toluene phase separated from the $H_2O$-phase, washed with water, dried, and concentrated in vacuo. To the residue are added 500 ml. of ether, the whole is stirred for 15 minutes, filtered, and concentrated in vacuo. The residue is recrystallised from cyclohexane. In this manner is obtained 2,4-dichloro-6-[1'-cyclopropyl-1'-cyanoethylamino]-s-triazine, M.P. 85–86°.

An amount of 5.2 g. of 2,4-dichloro-6-[1'-cyclopropyl-1'-cyanoethylamino]-s-triazine is dissolved in 70 ml. of toluene; to the solution are then slowly added dropwise at room temperature, with stirring and cooling, 3.4 g. of ethylamine dissolved in 3 ml. of water. After one hour, the mixture has a pH-value of 7. It is filtered, the toluene layer washed with water, dried, and concentrated by evaporation. The residue is recrystallised from hexane/benzene. Thus obtained is 2-chloro-4-ethylamino-6-[1'-cyclopropyl-1'-cyanoethylamino]-s-triazine, M.P.: 148–149°.

Example 2

The corresponding 2-methoxytriazine derivative is produced by the dissolving of 6.6 g. (0.025 mol) of 2-chloro-4-ethylamino - 6 - [1'-cyclopropyl-1'-cyanoethylamino]-s-triazine in 100 ml. of methanol, and the subsequent introduction, in gaseous form, of 3.0 g. (0.05 mol) of trimethylamine at room temperature. Refluxing is then performed for 60 hours, and the reaction solution then concentrated to dryness. The residue is recrystallised from ether/petroleum ether. Thus obtained is 2-methoxy-4-ethylamino - 6 - [1' - cyclopropyl-1'-cyanoethylamino]-s-triazine, M.P.: 114–115°.

Example 3

The triazine derivative according to Example 2 is also produced by the dissolving of 26.7 parts of 2-chloro-4-ethylamino - 6 - [1'-cyclopropyl - 1' - cyanoethylamino]-s-triazine in 100 parts of methanol, and the subsequent addition dropwise at room temperature of a solution of 2.3 parts of metallic sodium in 35 parts of methanol. The mixture is refluxed for 24 hours, filtered, and the filtrate concentrated to dryness. The residue is recrystallised from ether/petroleum ether. In this manner too is obtained 2-methoxy - 4 - ethylamino-6-[1'-cyclopropyl-1'-cyanoethylamino]-s-triazine, M.P.: 114–115°.

Example 4

An amount of 10.7 g. (0.04 mol) of 2-chloro-4-ethylamino - 6 - [1' - cyclopropyl - 1' - cyanoethylamino]-s-triazine (Example 1) is suspended in a mixture of 50 ml. of acetone and 50 ml. of water. To this suspension is added dropwise at room temperature, with stirring, a mixture of 6.1 g. of 40% aqueous trimethylamine solution and 20 ml. of water. The mixture is stirred at room temperature until a clear solution is obtained. Into this solution are fed at room temperature 4.0 g. (0.081 mol) of gaseous methylmercaptan. The reaction mixture is stirred for a further 12 hours at room temperature. The oil formed during the reaction is separated, the aqueous layer extracted with ether, and the ether extract combined with the oil. The residue remaining after the ether solution has been evaporated off crystallises after the addition of petroleum ether. It is recrystallised from ether/petroleum ether. The thus obtained 2-methylthio-4-ethylamino-6-[1'-cyclopropyl-1'-cyanoethylamino]-s-triazine has a melting point of 107–109°.

Example 5

An amount of 4 g. of sodium hydroxide is dissolved in 100 ml. of ethanol, and into this solution are passed 4.8 g. of methylmercaptan. To the thus obtained solution is added at room temperature a solution of 26.8 g. of 2-chloro - 4 - ethylamino-6-[1'-cyclopropyl-1'-cyanoethylamino]-s-triazine in 150 ml. of toluene, and the whole refluxed, with stirring, for 10 hours. The solution should afterwards show a neutral reaction. If this is not the case, refluxing is continued until a neutral condition is obtained. To the solution are afterwards added, at room temperature, 500 ml. of water; the aqueous layer is separated, extracted with toluene, and the combined toluene solutions are then concentrated to dryness. The residue is recrystallised from hexane, and thus is likewise obtained 2 - methylthio - 4 - ethylamino - 6 - [1' - cyclopropyl-1'-cyanoethylamino]-s-triazine, M.P. 107–109°.

EXAMPLE 6

From a solution of 2,4-dichloro-6-[1'-cyclopropyl-1'-cyanoethylamino]-s-triazine in toluene is produced with aqueous methylamine, corresponding to the last stage of Example 1, 2-chloro-4-methylamino-6-[1'-cyclopropylamino - 1' - cyanoethylamino]-s-triazine, M.P. 138–140°.

For the conversion of this compound into the corresponding 2-methylthio derivate, the procedure is as follows:

An amount of 4.8 g. of methylmercaptan is passed at 20° into a solution of 4 g. of NaOH in 100 ml. of ethanol. To this solution is added a solution of 25.4 g. of 2-chloro-4 - methylamino - 6 - [1' - cyclopropyl-1'-cyanoethylamino]-s-triazine in 150 ml. of toluene, and refluxing is carried out, with stirring, for 10 hours. If thereupon the mixture is still not neutral (pH=7), refluxing is continued for a further 3 hours. An amount of 500 ml. of water is then added, with stirring, at room temperature; the toluene layer is separated, dried, and the toluene evaporated off to dryness. The residue is recrystallised from benzene/hexane. The thus obtained 2-methylthio-4-methylamino - 6 - [1' - cyclopropyl-1'-cyanoethylamino]-s-triazine has the melting point 113–114°.

EXAMPLE 7

25.8 Parts of 2,4-dichloro-6-[1'-cyclopropyl-1'-cyanoethylamino]-s-triazine (see Example 1) are dissolved in 40 parts of acetone; into this solution are then fed, at 0 to $+5°$, 4.8 parts of methylmercaptan. To the obtained solution are added dropwise, at 0 to $+5°$, 25 parts by volume of 4N NaOH; the whole is then stirred until the reaction mixture has become neutral. To the mixture are now added 5.9 parts of isopropylamine and 25 parts by volume of 4N NaOH, and refluxing is performed until a neutral reaction is obtained (ca. 3 hours). The reaction mixture is afterwards cooled, 100 parts of water are added, and the precipitate is filtered off. It is washed with water and dried. Thus obtained is 2-methylthio-4-isopropylamino - 6 - [1'-cyclopropyl-1'1-cyanoethylamino]-s-triazine, M.P. 110–112°.

The new starting materials of the general formula II (aminonitriles) can be produced, apart from by the process described in Example 1, also by other means, especially from the ketones of formula V with excess hydrocyanic acid and excess ammonia at elevated temperature under pressure ((autoclave). Furthermore, they can be produced by the heating of the starting ketone under pressure with excess ammonium cyanide.

The preparation of cyclopropylaminonitrile of formula II serving as starting materials is further described in the following:

(a) An 0.3 litre autoclave is charged with 25 g. of methylcyclopropyl ketone, 30 g. of hydrocyanic acid and 20 g. of ammonia, and shaken for 10 hours at a temperature of 80° C. The liquid reaction mixture is then dried with $Na_2SO_4$, residual hydrocyanic acid and ammonia are removed by concentration by evaporation, and the residue is dissolved in ether. Into the ethereal solution is fed anhydrous hydrogen chloride gas, whereby the hydrochloride of α-cyclopropyl-α-aminopropionitrile precipitates; M.P. 88–90°.

(b) In an autoclave are shaken 25 g. of methylcyclopropyl ketone and 50 g. of ammonium cyanide for 10 hours at 80° C. The processing of the cooled reaction mixture is effected as described under (a). In this manner too is obtained the α-cyclopropyl-α-aminopropionitrile hydrochloride, M.P. 88*90°.

By the process described above under a) have also been produced the following aminonitriles of formula II:

2-cyclopropyl-2-aminovaleronitrile; melting point of the hydrochloride: 107–109°
2,2-dicyclopropyl-2-aminoacetonitrile; melting point of the hydrochloride: 111–112°
2-[1''-methylcyclopropyl[-2-aminopropionitrile; melting point of the hydrochloride: 102–105°
2-[2''-methylcyclopropyl]-2-aminopropionitrile;
2-cyclopropyl-2-aminosovaleronitrile; melting point of the hydrochloride: 107–109°.

EXAMPLE 8

9.7 parts by weight of 2,4-dichloro-6-ethylamino-s-triazine are dissolved in 75 parts by volume of benzene, and 7.3 parts by weight of α-cyclopropyl-α-aminopropiionitrile hydrochloride are added. To this solution is then added dropwise at room temperature, with stirring, a solution of 2.03 parts by weight of caustic soda in 35 parts of water. The mixture is then heated to 60° C. and stirred until it shows a neutral reaction (ca. 3 hours). The mixture is afterwards allowed to cool to room temperature, and 7.6 parts by weight of a 40% aqueous trimethylamine solution are added. The mixture is vigorously stirred overnight at room temperature, and 2.5 parts by weight of gaseous methylmercaptan are then fed in. The mixture is stirred at room temperature for a further 12 hours. The aqueous phase is afterwards separated; it is washed once with benzene and the combined and dried benzene solutions are then evaporated off until a viscous yellow oil remains. This crystallises on trituration with petroleum ether. After recrystallisation from ether/petroleum ether is thus obtained 2-methylthio - 4 - ethylamino - 6-[1'-cyclopropyl-1'-cyanoethylamino]-s-triazine having the melting point 106–109°.

EXAMPLE 9

Corresponding to the last step of Example 1, 12.9 g. of 2,4 - dichloro - 6 - [1' - cyclopropyl-1'-cyano-ethylamino]-s-triazine are dissolved in 100 ml. of toluene, and to this solution is added dropwise, at 10° C., a solution of 1.7 g. of $NH_3$ (excess) in 20 ml. of water. The obtained mixture is stirred at room temperature until it shows a neutral reaction; to the mixture are then added about 50 ml. of water, the aqueous layer is separated from the organic layer, and the latter concentrated by evaporation to dryness. The residue is recrystallised from ether with the addition of petroleum ether. Thus obtained is 2-chloro - 4 - amino - 6 - [1'-cyclopropyl-1'-cyano-ethylamino]-s-triazine, M.P. 166–169°.

By the procedures described in the preceding examples are also produced the s-triazine derivatives listed in the following table.

| Compound | M.P., °C. |
|---|---|
| 2-chloro-4-ethylamino-6-[1'-cyclopropyl-1'-cyano-ethylamino]-s-triazine | 149–150 |
| 2-chloro-4-methylamino-6-[1'-cyclopropyl-1'-cyano-ethylamino]-s-triazine | 138–140 |
| 2-chloro-4-cyclopropylamino-6-[1'-cyclopropyl-1'-cyano-ethylamino]-s-triazine | 136–138 |
| 2-methylthio-4-ethylamino-6-[1'-cyclopropyl-1'-cyano-ethylamino]-s-triazine | 107–109 |
| 2-methoxy-4-ethylamino-6-[1'-cyclopropyl-1'-cyano-ethylamino]-s-triazine | 114–115 |
| 2-methylthio-4-cyclopropylamino-6-[1'-cyclopropyl-1'-cyano-ethylamino]-s-triazine | 94–96 |
| 2-methylthio-4-methylamino-6-[1'-cyclopropyl-1'-cyano-ethylamino]-s-triazine | 113–114 |
| 2-methylthio-4-isopropylamino-6-[1'-cyclopropyl-1'-cyano-ethylamino]-s-triazine | 110–112 |
| 2-methoxy-4-isopropylamino-6-[1'-cyclopropyl-1'-cyano-ethylamino]-s-triazine | 74–76 |
| 2-chloro-4-ethylamino-6-[1'-cyclopropyl-1'-cyano-n-butylamino]-s-triazine | 174–176 |
| 2-methylthio-4-ethylamino-6-[1'-cyclopropyl-1'-cyano-n-butylamino]-s-triazine | 94–95 |
| 2-chloro-4-isopropylamino-6-[1'-cyclopropyl-1'-cyano-ethylamino]-s-triazine | 141–142 |
| 2-chloro-4-tert-butylamino-6-[1'-cyclopropyl-1'-cyano-ethylamino]-s-triazine | 144–146 |
| 2-chloro-4-amino-6-[1'-cyano-1'-cyclopropyl-ethylamino]-s-triazine | 169–170 |
| 2-chloro-4-isobutylamino-6-[1'-cyano-1'-cyclopropyl-ethylamino]-s-triazine | 144–145 |
| 2-chloro-4-cyclopentylamino-6-[1'-cyano-1'-cyclopropyl-ethylamino]-s-triazine | 150–151 |
| 2-chloro-4-cyclobutylamino-6-[1'-cyano-1'-cyclopropyl-ethylamino]-s-triazine | 158–159 |
| 2-methylthio-4-cyclopentylamino-6-[1'-cyano-1'-cyclopropyl-ethylamino]-s-triazine | 106–108 |
| 2-methylthio-4-ethylamino-6-[1'-cyclopropyl-1'-cyanoisobutyl-amino]-s-triazine | |
| 2-methylthio-4-cyclopropylamino-6-[1'-cyclopropyl-1'-cyanoisobutylamino]-s-triazine | |
| 2-methylthio-4-isopropylamino-6-[1'-cyclopropyl-1'-cyanoisobutylamino]-s-triazine | |
| 2-methylthio-4-methylamino-6-[1'-cyclopropyl-1'-cyanoisobutylamino]-s-triazine | |
| 2-chloro-4-ethylamino-6-[1'-cyano-1'-cyclopropylisobutylamino]-s-triazine | 197–200 |
| 2-chloro-4-cyclopropylamino-6-[1'-cyano-1'-cyclopropyliso-butylamino]-s-triazine | 172–174 |
| 2-chloro-4-isopropylamino-6-[1'-cyano-1'-cyclopropylisobutylamino]-s-triazine | |
| 2-chloro-4-methylamino-6-[1'-cyano-1'-cyclopropylisobutyl-amino]-s-triazine | 175–177 |
| 2-methoxy-4-ethylamino-6-[1'-cyano-1'-cyclopropylisobutyl-amino]-s-triazine | |
| 2-methoxy-4-cyclopropylamino-6-[1'-cyano-1'-cyclopropyliso-butylamino]-s-triazine | |
| 2-methoxy-4-isopropylamino-6-[1'-cyano-1'-cyclopropyliso-butylamino]-s-triazine | |
| 2-methoxy-4-methylamino-6-]1'cyano-1'-cyclopropylisobutyl-amino]-s-triazine | |
| 2-chloro-4-methylamino-6-[dicyclopropyl-cyanomethylamino]-s-triazine | 169–171 |
| 2-chloro-4-ethylamino-6-[dicyclopropyl-cyanomethylamino]-s-triazine | 185–186 |
| 2-chloro-4-isopropylamino-6-[dicyclopropyl-cyanomethylamino]-s-triazine | |
| 2-chloro-4-cyclopropylamino-6-[dicyclopropylcyano-methyl-amino]-s-triazine | 159–161 |
| 2-methoxy-4-methylamino-6-[dicyclopropyl-cyanomethyl-amino]-s-triazine | |
| 2-methoxy-4-ethylamino-6-[dicyclopropyl-cyanomethylamino]-s-triazine | |
| 2-methoxy-4-isopropylamino-6-[dicyclopropylcyano-methyl-amino]-s-triazine | |
| 2-methoxy-4-cyclopropylamino-6-[dicyclopropylcyano-methyl-amino]-s-triazine | |
| 2-methylthio-4-methylamino-6-[dicyclopropylcyano-methyl-amino]-s-triazine | |
| 2-methylthio-4-ethylamino-6-[dicyclopropylcyano-methyl-amino]-s-triazine | 100–102 |
| 2-methylthio-4-isopropylamino-6-[dicyclopropyl-cyano-methyl-amino]-s-triazine | |
| 2-methylthio-4-cyclopropylamino-6-[dicyclopropyl-cyano-methylamino]-s-triazine | |
| 2-chloro-4-methylamino-6-[1-cyano-1-1'-methyl-cyclopropyl-ethylamino]-s-triazine | 157–158 |
| 2-chloro-4-ethylamino-6-[1-cyano-1-1'-methyl-cyclopropyl-ethylamino]-s-triazine | 162–163 |
| 2-chloro-4-isopropylamino-6-[1-cyano-1-1'-methyl-cyclopropyl-ethylamino]-s-triazine | 167–170 |

TABLE—Continued

| Compound | M.P., °C. |
|---|---|
| 2-chloro-4-cyclopropylamino-6-[1-cyano-1-1'-methyl-cyclopropyl-ethylamino]-s-triazine | 141–144 |
| 2-methylthio-4-amino-6-[1-cyano-1-cyclopropyl-ethylamino]-s-triazine | 124–126 |
| 2-methylthio-4-methylamino-6-[1'-cyano-1'-1''-methyl-cyclopropyl-ethylamino]-s-triazine | |
| 2-methylthio-4-ethylamino-6-[1'-cyano-1'-1''-methyl-cyclopropyl-ethylamino]-s-triazine | 117–118 |
| 2-methylthio-4-isopropylamino-6-[1'-cyano-1'-1''-methylcyclopropyl-ethylamino]-s-triazine | |
| 2-methylthio-4-cyclopropylamino-6-[1'-cyano-1'-1''-methylcyclopropyl-ethylamino]-s-triazine | |
| 2-methoxy-4-methylamino-6-[1'-cyano-1'-1''-methylcyclopropyl-ethylamino]-s-triazine | |
| 2-methoxy-4-ethylamino-6-[1'-cyano-1'-1''-methylcyclopropyl-ethylamino]-s-triazine | |
| 2-methoxy-4-isopropylamino-6-[1'-cyano-1'-1''-methylcyclopropyl-ethylamino]-s-triazine | |
| 2-methoxy-4-cyclopropylamino-6-[1'-cyano-1'-1''-methylcyclopropyl-ethylamino]-s-triazine | |
| 2-chloro-4-methylamino-6-[1'-cyano-1'-2''methylcyclopropyl-ethylamino]-s-triazine | |
| 2-chloro-4-ethylamino-6-[1'-cyano-1'-2''-methylcyclopropyl-ethylamino]-s-triazine | |
| 2-methylthio-4-methylamino-6-[1'-2''-methylcyclopropyl-ethylamino]-s-triazine | |
| 2-methylthio-4-ethylamino-6-[1'-2''-methylcyclopropyl-ethylamino-s-triazine | |
| 2-methylthio-4-cyclopropylamino-6-[1'-2''-methylcyclopropyl-ethylamino]-s-triazine | |
| 2-chloro-4-isopropylamino-6-[1'-2''-methyl-cyclopropyl-ethylamino]-s-triazine | |
| 2-chloro-4-cyclopropylamino-6-[1'-2''-methylcyclopropyl-ethylamino]-s-triazine | |
| 2-methylthio-4-isopropylamino-6-[1',2''-methylcyclopropyl-ethylamino]-s-triazine | |
| 2-chloro-4-cyclopropylamino-6-[1'-cyano-1'-cyclopropyl-n-butylamino]-s-triazine | 140–142 |
| 2-chloro-4-amino-6-[1'-cyano-1'-1''-methyl-cyclopropyl-ethylamino]-s-triazine | 207–208 |

The herbicidal effectiveness of the compounds according to the invention is demonstrated by the following tests:

| No. | Compound |
|---|---|
| 1 | 2-methylthio-4-ethylamino-6-[1'-cyclopropyl-1'-cyano-ethylamino]-s-triazine. |
| 2 | 2-methoxy-4-ethylamino-6-[1'-cyclopropyl-1'-cyano-ethylamino]-s-triazine. |
| 3 | 2-methylthio-4-cyclopropylamino-6-[1'-cyclopropyl-1'-cyano-ethylamino]-s-traizine. |
| 4 | 2-methylthio-4-methylamino-6-[1'-cyclopropyl-1'-cyano-ethylamino]-s-triazine. |
| 5 | 2-methylthio-4-isopropylamino-6-[1'-cyclopropyl-1'-cyano-ethylamino]-s-triazine. |
| 6 | 2-chloro-4-ethylamino-6-[1'-cyclopropyl-1'-cyano-ethylamino]-s-triazine. |
| 7 | 2-chloro-4-methylamino-6-[1'-cyclopropyl-1'-cyano-ethylamino]-s-triazine. |
| 8 | 2-chloro-4-cyclopropylamino-6-[1'-cyclopropyl-1'-cyano-ethylamino]-s-triazine. |
| 9 | 2-chloro-4-isopropylamino-6-[1'-cyclopropyl-1'-cyano-ethylamino]-s-triazine. |
| 10 | 2-chloro-4-tert.-butylamino-6-[1'-cyclopropyl-1'-cyano-ethylamino]-s-triazine. |
| 11 | 2-chloro-4-isobutylamino-6-[1'-cyclopropyl-1'-cyano-ethylamino]-s-triazine. |
| 12 | 2-chloro-4-amino-6-[1'-cyclopropyl-1'-cyano-ethylamino]-s-triazine. |
| 12a | 2-methylthio-4-amino-6-[1'-cyclopropyl-1'-cyano-ethylamino]-s-triazine. |

| Known comparison substances | |
|---|---|
| 13 | 2-chloro-4-ethylamino-6-[1'-methyl-1'-cyano-ethylamino]-s-triazine. |
| 14 | 2-chloro-4-isopropylamino-6-[1'-methyl-1'-cyano-ethylamino]-s-triazine. |
| 15 | 2-methoxy-4-isopropylamino-6-[1'-methyl-1'-cyano-ethylamino]-s-triazine. |
| 16 | 2-methoxy-4-ethylamino-6-[1'-methyl-1'-cyano-ethylamino]-s-triazine. |
| 17 | 2-methylthio-4-ethylamino-6-[1'-methyl-1'-cyano-ethylamino]-s-triazine. |
| 18 | 2-methylthio-4-isopropylamino-6-[1'-methyl-1'-cyano-ethylamino]-s-triazine. |
| | (The compounds Nos. 13 to 18 are known from the French Pat. No. 1,536,479.) |
| 19 | 2-methoxy-4-cyclopropylamino-5-[1'-cyano-1'-methyl-ethylamino]-s-triazine (known from the Belgian Pat. No. 730,134). |
| 20 | 2-methylthio-4-cyclopropylamino-6-[1'-cyano-1'-methyl-ethylamino]-s-triazine (known from the Belgian Pat. No. 730,135). |

The herbicidal action of the compounds according to the invention was determined by means of the following tests:

1. Herbicidal action before emergence of the plants (a) The active substances are mixed together with seed-bed soil in a concentration of 100 mg. of active substance per litre of soil. Into this soil are planted the following test plants (seed trays):

Common oats (*Avena sativa*), Italian rye-grass (*Lolium multiflorum*), millet (*Setaria italica*), mustard (*Sinapis alba*), common vetch (*Vicia sativa*), tomato (*Solanum lycopersicanum*).

The seed trays are afterwards kept in a greenhouse at 22–25° with 50–70% relative humidity. The results of the tests are assessed after 20 days. The evaluation is based on the following scale:

1 = plants dead,
2–4 = intermediate stages of damage (over 50%),
5 = 50% damage,
6–8 = intermediate stages of lesser damage (below 50%),
9 = plants undamaged = control.

Table to (1a)

| Substance No. | Oats | Rye grass | Millet | Mustard | Tomato | Vetch |
|---|---|---|---|---|---|---|
| 1 | 1 | 1 | 1 | 1 | 1 | 4 |
| 2 | 1 | 1 | 1 | 1 | 1 | 1 |
| 3 | 1 | 1 | 1 | 1 | 1 | 7 |
| 4 | 1 | 1 | 1 | 1 | 1 | 3 |
| 5 | 3 | 1 | 1 | 1 | 1 | 7 |
| 6 | 1 | 1 | 1 | 1 | 1 | 1 |
| 7 | 3 | 1 | 1 | 1 | 2 | 2 |
| 8 | 3 | 1 | 1 | 1 | 1 | 1 |
| 9 | 2 | 1 | 1 | 1 | 1 | 1 |
| 10 | 6 | 2 | 4 | 1 | 3 | 2 |
| 11 | 4 | 4 | 7 | 1 | 6 | 3 |
| 12 | 1 | 1 | 1 | 1 | 1 | 1 |
| 12a | 2 | 1 | 1 | 1 | 1 | 1 |

(b) Immediately after sowing of the test plants, the active substances are applied as an aqueous suspension, obtained from a 25% wettable powder, to the surface of the soil. The seed trays are then kept at 22–23° with 50–70% relative humidity. The results of the test are assessed after 28 days.

The following were used as test plants:

Weeds

| | |
|---|---|
| Italian rye-grass | (*Lolium multiflorum*) |
| Millet I | (*Setaria italica*) |
| Millet II | (*Echinochloa crus galli*) |
| Mustard | (*Sinapis alba*) |
| Goose-grass | (*Galium aparine*) |
| Pigweed varieties | (*Amaranthus spp.*) |
| Slender foxtail | (*Alopecurus myosuroides*) |
| Rough stalked meadow-grass | (*Poa trivialis*) |

Cultivated plants

| | |
|---|---|
| Wheat | (*Triticum vulgare*) |
| Sorghum | (*Sorghum spp.*) |
| Soya beans | (*Glycine hyspida*) |
| Cotton | (*Grossypium herbaccara*) |

The respective amounts applied in this test are shown in the following table.

The evaluation is according to the following scale:

1 = plants dead,
2–4 = intermediate stages of severe damage (above 50%),
5 = 50% damage,
6–8 = intermediate stages of lesser damage (below 50%),
9 = plants undamaged = control.

Composition of the 25% wettable powder: 25 parts of active substance, 10 parts of sodium aluminium silicate, 0.6 part of sodium dibutylnaphthyl sulphonate, 1.0 part of naphthalenesulphonic acid/formaldehyde condensate 3:2:1, 63.4 parts of kaolin. These wettable powders are suspended in an amount of water corresponding to 1,000 litres per hectare.

TABLE TO (1B)

| Substance No. | Amount used, kg./ha. | Weeds | | | | | | | | Cultivated plants | | | |
|---|---|---|---|---|---|---|---|---|---|---|---|---|---|
| | | Rye grass | Millet I | Millet II | Mustard | Galium | Amaranthus | Alopecurus | Poa triv. | Wheat | Sorghum | Soya | Cotton |
| *2-chlorotriazines* | | | | | | | | | | | | | |
| 6 | 2 | 2 | 2 | 1 | 2 | 2 | | | | | 7 | | |
|   | 1 | 3 | 2 | 2 | 2 | 2 | | | | | 8 | | |
| 7 | 4 | 1 | 1 | 1 | 1 | 2 | | | | 7 | | | |
|   | 2 | 1 | 1 | 2 | 1 | 2 | | | | 7 | | | |
|   | 1 | 2 | 2 | 4 | 2 | | | | | 9 | | | |
| 8 | 4 | 1 | 1 | 1 | 1 | 2 | | | | 8 | | | |
|   | 2 | 2 | 2 | 1 | 1 | 2 | | | | 9 | | 5 | |
|   | 1 | 2 | 2 | 1 | 3 | 4 | | | | 9 | | 9 | |
| 12 | 4 | 1 | 1 | 1 | 1 | 1 | 1 | 1 | 1 | 1 | 3 | 1 | 1 |
|    | 2 | 1 | 3 | 1 | 1 | 2 | 1 | 1 | 1 | 1 | 6 | 1 | 1 |
|    | 1 | 2 | 7 | 2 | 1 | 2 | 1 | 1 | 1 | 5 | 8 | 1 | 8 |
|    | 0.5 | 3 | 9 | 5 | 2 | 8 | 1 | 2 | 1 | 9 | 9 | 9 | 8 |
| 13 (known) | 4 | 1 | | 1 | 1 | 1 | | | | 1 | | | |
|            | 2 | 1 | | 1 | 1 | 1 | | | | 1 | | 1 | |
|            | 1 | 1 | | 1 | 1 | 1 | | | | 1 | | 1 | |
| 14 (known) | 4 | 1 | | 1 | 1 | 4 | | | | 4 | | | |
|            | 2 | 1 | | 1 | 1 | 8 | | | | 6 | | 1 | |
|            | 1 | 1 | | 2 | 1 | 9 | | | | 6 | | 3 | |
| *2-methoxytriazines* | | | | | | | | | | | | | |
| 2 | 2 | 2 | | 1 | 1 | | | | | 9 | 8 | | 9 |
|   | 1 | 1 | | 1 | 1 | | | | | 9 | 9 | | 9 |
| 15 (known) | 2 | 2 | | 1 | 9 | | | | | 1 | 1 | | 3 |
|            | 1 | 1 | | 1 | 9 | | | | | 1 | 2 | | 7 |
| 16 (known) | 2 | 2 | | 1 | 9 | | | | | 2 | 1 | | 3 |
| 19 (known) | 2 | 2 | | 1 | | | | | | 1 | 1 | | 2 |
|            | 1 | 1 | | 3 | | | | | | 3 | 1 | | 6 |
| *2-methylthiotriazines* | | | | | | | | | | | | | |
| 1 | 4 | 1 | 1 | 1 | 1 | | 1 | 1 | 1 | 7 | | | |
|   | 2 | 1 | 1 | 1 | 2 | | 1 | 1 | 1 | 8 | | | |
|   | 1 | 2 | 1 | 1 | 3 | | 1 | 1 | 1 | 9 | | | |
|   | 0.5 | | 3 | 1 | 3 | | 1 | 1 | 1 | 9 | | | |
| 12a | 4 | 1 | 1 | 1 | 1 | 1 | 1 | 1 | 1 | 1 | 1 | 1 | 9 |
|     | 2 | 1 | 1 | 1 | 1 | 1 | 1 | 1 | 1 | 1 | 1 | 1 | 9 |
|     | 1 | 2 | 1 | 1 | 1 | | 1 | 1 | 1 | 4 | 4 | 9 | 9 |
|     | 0.5 | 2 | 1 | 4 | 1 | | 1 | 1 | 1 | 9 | 5 | 9 | 9 |
| 17 (known) | 4 | 1 | 1 | 1 | 3 | | | | | 3 | | | |
|            | 2 | 2 | 1 | 1 | 5 | | | | | 8 | | | |
|            | 1 | 4 | 1 | 1 | 7 | | | | | 9 | | | |
|            | 0.5 | | 6 | 2 | 7 | | | | | 9 | | | |
| 18 (known) | 4 | 1 | 1 | 1 | 1 | | | | | 7 | | | |
|            | 2 | 2 | 1 | 1 | 2 | | | | | 8 | | | |
|            | 1 | 7 | 2 | 2 | 8 | | | | | 9 | | | |
|            | 0.5 | | 6 | 2 | 9 | | | | | 9 | | | |
| 20 (known) | 4 | 1 | 1 | | 1 | | | | | 1 | | | |
|            | 2 | 1 | 1 | | 1 | | | | | 4 | | | |
|            | 1 | 1 | 1 | | 3 | | | | | 5 | | | |
|            | 0.5 | | 2 | | 6 | | | | | 7 | | | |

The above test results shown the wide herbicidal sphere of action of the active substances according to the invention. Particularly clearly illustrated is the selective action: The compounds 6, 7 and 8 according to the invention do practically no damage to the cultivated plants whilst having a good action against the weeds, even where large amounts are applied, this being in contrast to the structurally related comparison substances; whereas the compound 1, with equal or better selectivity with respect to wheat, is clearly superior, particularly in the case of small applied amounts, to the corresponding structurally related comparison compounds with regard to effectiveness against weeds.

Compound 2 is clearly superior to the structurally related 2-methoxytrianzines by virtue of an outstanding degree of selectivity with respect to cultivated plants and by virtue of an excecllent weed-action on Echinochloa.

2. Preemergence test in rice with sown weeds (a) Dry test: Pots are filled with garden soil, and the test plant rice (*Oryza oryzoides*) and, as weed, barngrass (*Echinochloa crusgalli*) are sown.

The active substance is processed into the form of a 25% wettable powder, and applied, as an aqueous dispersion, to the surface of the soil immediately after sowing (amount of liquor: 100 ml. square metre).

(b) Wet test: The aqueous dispersion of the active substance is applied to the surface of the soil in the test containers, and worked in to a depth of ca. 1 cm. The test plants, rice and millet (*Echinochloa crusgalli*), are then sown, and the soil is completely saturated with water. After emergence of the seed, the water level in the containers is raised to ca. 2-3 cm. above the surface of the soil.

Both tests are carried out in a greenhouse at 24–27° C with 70% relative humidity. The assessment of the test results is made after 28 days, whereby the evaluation is based on the following scale:

9 = plants undamaged = control,
1 = plant dead,
8–2 = intermediate stages of damage.

TABLE 2 (TO 2)

| Substance number | Amount used, kg./hect. | Wet test Echinochloa crusgalli | Wet test Rice | Dry test Echinochloa crusgalli | Dry test Rice |
|---|---|---|---|---|---|
| 1 | 4 | 1 | 3 | 1 | 8 |
|   | 0.5 | 1 | 9 | 1 | 9 |
| 17 (known) | 4 | 1 | 1 | 1 | 2 |
|   | 0.5 | 8 | 9 | 2 | 9 |
| 18 (known) | 4 | 1 | 3 | 1 | 3 |
|   | 0.5 | 5 | 9 | 2 | 9 |

The values in the table show, in the case of high amounts used, a clearly better selectivity (i.e. preservation of the rice, particularly in the dry test) of compound 1 according to the invention, in comparison to two structurally related known active substances. On the other hand, the compound according to the invention is, in the case of low amounts used, far superior to the comparison substances in the herbicidal action against Echinochloa, especially in the wet test, in consequence of which the compounds according to the invention appear particularly suitable for the control of weeds in rice cultivations.

Herbicidal agents according to the invention are produced in a manner known per se by the intimate mixing and grinding of active substances of the general formula I with suitable carriers, optionally with the addition of dispersing agents or solvents which are inert to the active substances. The active substances can be obtained and used in the following forms:

solid preparations: dusts, scattering agents, granulates, (coated granulates, impregnated granulates and homogeneous granulates);
water-dispersible concentrates of the active substance: wettable powders, pastes, emulsions;
liquid preparations: solutions.

The solid preparations (dusts, scattering agents, granulates) are produced by the mixing of the active substances with solid carriers. Suitable carriers are, e.g. kaolin, talcum, bole, loess, chalk, limestone, ground limestone, Attaclay, dolomite, diatomaceous earth, precipitated silicic acid, alkaline- earth silicates, sodium and potassium aluminium silicates (feldspar and mica), calcium and magnesium sulphates, magnesium oxide, ground synthetic materials, fertilisers such as ammonium sulphate, ammonium phosphates, ammonium nitrate, urea, ground vegetable products such as bran, bark dust, sawdust, ground nutshells, cellulose powder, residues of plant extractions, active charcoal, etc., alone or in admixture with each other.

The particle size of the carriers is for dusts advantageously up to about 0.1 mm.; for scattering agents from about 0.075 mm. to 0.2 mm.; and for granulates 0.2 mm. or coarser.

The concentrations of active substance in the solid preparation forms are from 0.5 to 80%.

To these mixtures may also be added additives stabilising the active substance, and/or or non-ionic, anion-active, and cation-active substances, which, for example, improve the adhesiveness of the active substances on plants and on parts of plants (adhesives and agglutinants), and/or ensure a better wettability (wetting agents) and dispersibility (dispersing agents). Suitable adhesives are, for example, the following: olein/chalk mixture, cellulose derivatives (methyl cellulose, carboxymethyl cellulose), hydroxyethyl glycol ethers of monoalkyl and dialkyl phenols having 5 to 15 ethylene oxide radicals per molecule and 8 to 9 carbon atoms in the alkyl radical, ligninsulphonic acids, their alkali metal and alkaline-earth metal salts, polyethylene glycol ethers (carbowaxes), fatty alcohol polyethylene glycol ethers having 5 to 20 ethylene oxide radicals per molecule and 8 to 18 carbon atoms in the fatty alcohol moiety, condensation products of ethylene oxide, propylene oxide, polyvinyl pyrrolidones, polyvinyl alcohols, condensation products of urea and formaldehyde, as well as latex products.

Water-dispersible concentrates of active substance, i.e. wettable powders, pastes and emulsion concentrates, are agents which can be diluted with water to obtain any desired concentration. They consist of active substance, carrier, optionally additives which stabilise the active substance, surface-active substances, and anti-foam agents and, optionally, solvents. The concentration of active substance in these agents is 5 to 80%.

The wettable powders and the pastes are obtained by the mixing and grinding of the active substances with dispersing agents and pulverulent carriers, in suitable devices, until homogeneity is attained. Suitable carriers are, e.g. those previously mentioned in the case of solid preparations. It is advantageous in some cases to use mixtures of different carriers. As dispersing agents it is possible to use, e.g.: condensation products of sulphonated naphthalene and sulphonated naphthalene derivatives with formaldehyde, condensation products of naphthalene or of naphthalenesulphonic acids with phenol and formaldehyde, as well as alkali, ammonium and alkaline-earth metal salts of ligninsulphonic acid, also alkylaryl sulphonates, alkali salts and alkaline-earth metal salts of dibutyl naphthalenesulphonic acid, fatty alcohol sulphates such as salts of sulphated hexadecanols, heptadecanols, octadecanols, and salts of sulphated fatty alcohol glycol ether, the sodium salt of oleyl methyl tauride, ditertiary acetylene glycols, dialkyl dilauryl ammonium chloride, and fatty acid alkali-metal and alkaline-earth metal salts.

Suitable anti-foam agents are, for example, silicones.

The active substances are so mixed, ground, sieved and strained with the above mentioned additives that the solid constituent in the case of wettable powders has a particle size not exceeding 0.02 to 0.04 mm., and in the case of pastes not exceeding 0.03 mm. For the preparation of emulsion concentrates and pastes are used dispersing agents such as those mentioned in the preceding paragraphs, organic solvents, and water. Suitable solvents are, e.g. the following: alcohols, benzene, xylenes, toluene, dimethylsulphoxide, and mineral oil fractions boiling in the range of 120 to 350°. The solvents must be practically odourless, non-phytotoxic, inert to the active substances, and not readily inflammable.

Furthermore, the agents according to the invention can be used in the form of solutions. For this purpose, the active substance (or several active substances) is (or are) dissolved in suitable organic solvents, mixtures of solvents, or water. As organic solvents it is possible to use aliphatic and aromatic hydrocarbons, their chlorinated derivatives, alkylnaphthalenes, mineral oils on their own or in admixture with each other. The solutions should contain the active substances in a concentration of from 1 to 20%.

To the described agents according to the invention may be added other biocidal active substances or agents. For the widening of their sphere of action, the new agents may also contain, in addition to the stated compounds of the general formula I, e.g. insecticides, fungicides, bactericides, fungistatics, bacteriostatics or nematocides. The agents according to the invention can also contain fertilisers, trace elements, etc.

In the following are described preparations of the new triazines. The term "parts" denotes parts by weight.

Granulate

The following substances are used for the preparation of a 5% granulate:

5 parts of 5-methylthio-4-ethylamino-6-[1'-cyclopropyl-1'-cyano-ethylamino]-s-triazine,
0.25 parts of epichlorohydrin,
0.25 parts of cetyl polyglycol ether,
3.50 parts of polyethylene glycol,
91 parts of kaolin (particle size 0.3 to 0.8 mm.).

The active substance is mixed with epichlorohydrin and the mixture dissolved in 6 parts of acetone; to the solution are thereupon added polyethylene glycol and cetyl polyglycol ether. The thus obtained solution is sprayed on to kaolin, and then evaporated in vacuo.

Wettable powder

The following constituents are used for the preparation (a) a 50%, (b) a 25%, and (c) a 10% wettable powder:

(a)

50 parts of 2-chloro-4-ethylamino-6-[1'-cyclopropyl-1'-cyano-ethylamino]-s-triazine,
5 parts of sodium dibutylnaphthyl sulphonate,
3 parts of naphthalenesulphonic acid/phenolsulphonic acid/formaldehyde condensate 3:2:1,
20 parts of kaolin,
22 parts of Champagne chalk;

(b)

25 parts of 2-chloro-4-methylamino-6-['-cyclopropyl-1'-cyano-ethylamino]-s-triazine,
5 parts of the sodium salt of oleylmethyl tauride,
2.5 parts of naphthalenesulphonic acid/formaldehyde condensate,
0.5 parts of carboxymethyl cellulose,
5 parts of neutral potassium aluminium silicate,
62 parts of kaolin;

(c)

10 parts of 2-chloro-4-cyclopropylamino-6-[1'-cyclopropyl-1'-cyano-ethylamino]-s-triazine,
3 parts of a mixture of sodium salts of saturated fatty alcohol sulphates,
5 parts of naphthalenesulphonic acid/formaldehyde condensate,
82 parts of kaolin.

The stated active substance is absorbed onto the corresponding carriers (kaolin and chalk), and subsequently mixed and ground. Wettable powders having excellent wettability and suspension properties are thus obtained. From such wettable powders can be obtained, by dilution with water, suspensions of any desired concentration of active substance. Such suspensions are used for the control of weeds and wild grasses in cultivated plantations.

Paste

The following substances are used for the preparation of a 45% paste:

45 parts of 2-methoxy-4-ethylamino-6-[1'-cyclopropyl-1'-cyano-ethylamino]-s-triazine,
5 parts of sodium aluminium silicate,
14 parts of cetyl polyglycol ether having 8 mol of ethylene oxide,
1 part of oleylpolyglycol ether having 5 mol of ethylene oxide,
2 parts of spindle oil,
10 parts of polyethylene glycol,
23 parts of water.

The active substance is intimately mixed and ground, in suitable devices, with the additives. A paste is thus obtained from which can be produced, by dilution with water, suspensions of any desired concentration. The suspensions are suitable for the treatment of vegetable plantations.

Emulsion concentrate

The following ingredients are mixed together for the preparation of 25% emulsion concentrate:

25 parts of 2-methylthio-4-ethylamino-6-[1'-cyclopropyl-1'-cyano-ethylamino]-s-triazine,
5 parts of a mixture of nonylphenolpolyoxyethylene and calcium dodecylbenzenesulphate ("Emullat P 140 HFP"),
35 parts of isophorone (3,5,5-trimethyl-2-cyclohexene-1-one),
35 parts of dimethylformamide.

This concentrate can be diluted with water to obtain emulsions of suitable concentrations. Such emulsions are suitable for the control of weeds in cultivated plantations such as, e.g. cotton, maize, etc.

What is claimed is:

1. A herbicidal composition comprising (1) a compound of the formula

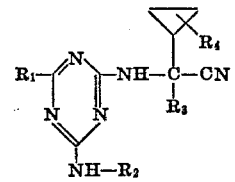

in which $R_1$ is chlorine, methoxy, methylthio or ethylthio; $R_2$ is hydrogen, alkyl having from 1 to 4 carbon atoms or cycloalkyl having from 3 to 5 carbon atoms; $R_3$ is alkyl having from 1 to 3 carbon atoms or cyclopropyl; and $R_4$ represents hydrogen or methyl, and (2) a carrier.

2. A method for the control of weeds and wild grasses which comprises applying thereto a herbicidally effective amount of a compound of the formula

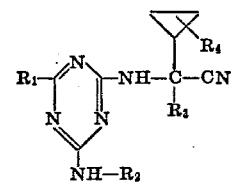

in which $R_1$ is chlorine, methoxy, methylthio or ethylthio; $R_2$ is hydrogen, alkyl from 1 to 4 carbon atoms or cycloalkyl of from 3 to 5 carbon atoms; $R_3$ is alkyl of from 1 to 3 carbon atoms or cyclopropyl; and $R_4$ is hydrogen or methyl.

3. A method according to claim 2 in which the compound is 2-methylthio-4-ethylamino-6-[1'-cyclopropyl-1'-cyano-ethylamino]-s-triazine.

4. A method according to claim 2 in which the compound is 2-methoxy-4-ethylamino-6-[1'-cyclopropyl-1'-cyano-ethylamino]-s-triazine.

5. A method according to claim 2 in which the compound is 2-methylthio-4-cyclopropylamino-6-[1'-cyclopropyl-1'-cyano-ethylamino]-s-triazine.

6. A method according to claim 2 in which the compound is 2-methylthio-4-methylamino-6-[1'-cyclopropyl-1'-cyano-ethylamino]-s-triazine.

7. A method according to claim 2 in which the compound is 2-methylthio-4-isopropylamino-6-[1'-cyclopropyl-1'-cyano-ethylamino]-s-triazine.

8. A method according to claim 2 in which the compound is 2-chloro-4-ethylamino-6-[1'-cyclopropyl-1'-cyano-ethylamino]-s-triazine.

9. A method according to claim 2 in which the compound is 2-chloro-4-methylamino-6-[1'-cyclopropyl-1'-cyano-ethylamino]-s-triazine.

10. A method according to claim 2 in which the compound is 2-chloro-4-cyclopropylamino-6-[1'-cyclopropyl-1'-cyano-ethylamino]-s-triazine.

11. A method according to claim 2 in which the compound is 2-chloro-4-isopropylamino-6-[1'-cyclopropyl-1'-cyano-ethylamino]-s-triazine.

12. A method according to claim 2 in which the compound is 2-chloro-4-tert.-butylamino-6-[1'-cyclopropyl-1'-cyano-ethylamino]-s-triazine.

13. A method according to claim 2 in which the compound is 2-chloro - 4 - isobutylamino-6-[1'-cyclopropyl-1'-cyano-ethylamino]-s-triazine.

14. A method according to claim 2 in which the compound is 2-chloro - 4 - amino-6-[1'-cyclopropyl-1'-cyano-ethylamino]-s-triazine.

15. A method according to claim 2 in which the compound is 2-methylthio - 4 - amino-6-[1'-cyclopropyl-1'-cyano-ethylamino]-s-triazine.

References Cited
UNITED STATES PATENTS 3,629,259  12/1971  Schwarze et al. ----- 260—249.8
3,505,325  4/1970  Schwarze et al. ---- 260—249.8

LEWIS GOTTS, Primary Examiner

C. L. MILLS, Assistant Examiner